United States Patent
Arndt et al.

(10) Patent No.: US 11,052,639 B2
(45) Date of Patent: Jul. 6, 2021

(54) THERMOPLASTIC FILM FOR A LAMINATED GLASS PANE

(71) Applicant: SAINT-GOBAIN GLASS FRANCE, Courbevoie (FR)

(72) Inventors: Martin Arndt, Aachen (DE); Michele Cappuccilli, Aachen (DE); Wolfgang Von Avenarius, Herzogenrath (DE); Li-Ya Yeh, Geilenkirchen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/609,663

(22) PCT Filed: Jul. 17, 2018

(86) PCT No.: PCT/EP2018/069372
§ 371 (c)(1),
(2) Date: Oct. 30, 2019

(87) PCT Pub. No.: WO2019/020432
PCT Pub. Date: Jan. 31, 2019

(65) Prior Publication Data
US 2020/0147934 A1    May 14, 2020

(30) Foreign Application Priority Data
Jul. 27, 2017    (EP) ..................... 17183444

(51) Int. Cl.
*B32B 17/10* (2006.01)
*G02B 27/01* (2006.01)

(52) U.S. Cl.
CPC .. *B32B 17/10036* (2013.01); *B32B 17/10761* (2013.01); *B32B 17/10568* (2013.01);
(Continued)

(58) Field of Classification Search
CPC ........ B32B 17/10036; B32B 17/10761; B32B 17/10568; G02B 27/0101
(Continued)

(56) References Cited

U.S. PATENT DOCUMENTS

| 5,013,134 A | 5/1991 | Smith |
| 5,639,538 A * | 6/1997 | Wong ................ B32B 17/10568 |
| | | 428/156 |

(Continued)

FOREIGN PATENT DOCUMENTS

| CA | 2968724 A1 * | 6/2016 | ....... B32B 17/10036 |
| DE | 195 35 053 A1 | 4/1996 | |

(Continued)

OTHER PUBLICATIONS

International Search Report as issued in International Patent Application No. PCT/EP/2018/069372, dated Aug. 10, 2018.
(Continued)

*Primary Examiner* — Tahseen Khan
(74) *Attorney, Agent, or Firm* — Pillsbury Winthrop Shaw Pittman LLP (57) ABSTRACT

Thermoplastic film suitable as an intermediate layer for a laminated glass pane, wherein the thermoplastic film includes a defined region, which is provided for a camera window or an HUD (head-up display) region that has a non-zero wedge angle, and a region surrounding the defined region on all sides, in which the thermoplastic film has a substantially constant thickness, wherein the maximum thickness in the defined region of the thermoplastic film is less than the thickness in the surrounding region.

20 Claims, 5 Drawing Sheets

(52) U.S. Cl.
CPC ..... *B32B 2315/08* (2013.01); *B32B 2605/006* (2013.01); *B32B 2605/08* (2013.01); *G02B 27/0101* (2013.01); *G02B 2027/0121* (2013.01)

(58) Field of Classification Search
USPC ......................................................... 428/172
See application file for complete search history.

(56) References Cited

U.S. PATENT DOCUMENTS

| | | | |
|---|---|---|---|
| 6,636,370 | B2 | 10/2003 | Freeman |
| 6,881,472 | B2 | 4/2005 | Freeman |
| 7,060,343 | B2 | 6/2006 | Freeman |
| 8,451,541 | B2 | 5/2013 | Labrot et al. |
| 2007/0148472 | A1* | 6/2007 | Masaki ............. B32B 17/10568 428/426 |
| 2007/0269639 | A1 | 11/2007 | Travis et al. |
| 2008/0176043 | A1* | 7/2008 | Masaki ............. B32B 17/10036 428/172 |
| 2019/0004325 | A1* | 1/2019 | Connor .............. G02B 27/0172 |
| 2019/0263315 | A1* | 8/2019 | Melcher ............... G02B 6/0028 |
| 2019/0339517 | A1* | 11/2019 | Sadakane ............. B32B 27/36 |

FOREIGN PATENT DOCUMENTS

| | | |
|---|---|---|
| DE | 196 11 483 A1 | 10/1997 |
| EP | 0 647 329 B1 | 4/1995 |
| EP | 1 063 205 B1 | 12/2000 |
| EP | 1 800 855 A1 | 6/2007 |
| EP | 2 883 693 A1 | 6/2015 |
| JP | H03-264184 A | 11/1991 |
| JP | H07-508690 A | 9/1995 |
| JP | 2004-203680 A | 7/2004 |
| JP | 2004-536009 A | 12/2004 |
| JP | 2007-223883 A | 9/2007 |
| JP | 2008-544878 A | 12/2008 |
| JP | 2010-105016 A | 5/2010 |
| JP | 2017-502124 A | 1/2017 |
| WO | WO 94/00787 A1 | 1/1994 |
| WO | WO 02/103434 A1 | 12/2002 |
| WO | WO 2006/122305 A2 | 11/2006 |
| WO | WO 2009/071135 A1 | 6/2009 |
| WO | WO 2015/086233 A1 | 6/2015 |
| WO | WO 2015/086234 A1 | 6/2015 |
| WO | WO 2016/208370 A1 | 12/2016 |
| WO | WO 2017/011435 A1 | 1/2017 |

OTHER PUBLICATIONS

Decision to Grant and Search Report as issued in Russian Patent Application No. 2020102862/05(004408), dated Nov. 18, 2020.
Notice of Reasons for Refusal as issued in Japanese Patent Application No. 2020-502266, dated Jan. 12, 2021.

* cited by examiner

THERMOPLASTIC FILM FOR A LAMINATED GLASS PANE

CROSS-REFERENCE TO RELATED APPLICATIONS

This application is the U.S. National Stage of PCT/EP2018/069372, filed Jul. 17, 2018, which in turn claims priority to European patent application number 17183444.3 filed Jul. 27, 2017. The content of these applications are incorporated herein by reference in their entireties.

The invention relates to a thermoplastic film suitable as an intermediate layer for a laminated glass pane, a method for its production, a laminated glass pane, as well as a method for production thereof and use thereof.

Laminated glass panes are currently used in many places, in particular in the vehicle sector. Here, the term "vehicle" is broadly construed and relates, among other things, to road vehicles, aircraft, watercraft, agricultural machinery, or even work equipment.

Laminated glass panes are also used in other sectors. These include, for example, architectural glazings as well information displays, e.g., in museums or as advertising displays.

A laminated glass pane generally has two glass surfaces that are laminated onto an intermediate layer. The glass surfaces themselves can be curved and usually have a constant thickness. The intermediate layer usually comprises a thermoplastic material, usually polyvinyl butyral (PVB), of a predefined thickness, e.g., 0.76 mm.

Since the laminated glass pane is generally inclined relative to an observer, double images occur. These double images are caused by the fact that incident light usually does not pass completely through both glass surfaces, but, instead, at least part of the light is first reflected and only passes through the second glass surface after that.

These double images are, in particular, noticeable in the darkness, in particular with strongly radiating light sources such as, for instance, the headlights of an oncoming vehicle.

These double images are extremely distracting. In particular in the field of camera windows, these double images result in misinformation. Camera windows are areas of a pane behind which a camera that displays images from the surroundings is installed. Such camera windows are assuming greater importance, for example, in the area of autonomous driving.

Frequently, the laminated glass pane is also used as a head-up display (HUD) for displaying information. In that case, an image is projected by means of a projection apparatus onto the laminated glass pane to insert data into the field of vision of the observer. In the vehicle sector, the projection apparatus is, for example, arranged on the dashboard such that the projected image is reflected on the nearest glass surface of the laminated glass pane inclined in the direction of the observer.

Again, however, part of the light enters the laminated glass pane and is then reflected, for example, on the inside boundary layer of the glass surface farther out from point of view of the observer and on the intermediate layer and subsequently leaves the laminated glass pane with an offset. Here, as well, a similar effect occurs, the effect of ghost images, relative to the image to be displayed.

A purely conventional compensation of ghost images by means of a wedge film with an invariable wedge angle results in that an overcompensation for double images in transmittance is observed. This results in that the respective observer is confused or, in the worst case, receives misinformation. To date, the attempt has been made to solve this problem by no longer arranging the surfaces of the panes parallel to one another, but, instead, at a fixed angle. This is accomplished, for example, in that the intermediate layer has a linearly and/or nonlinearly increasing and/or decreasing thickness. In the vehicle sector, the thickness is typically varied such that the smallest thickness is provided at the lower end of the laminated pane toward the engine compartment, whereas the thickness increases in the direction toward the roof, in other words the intermediate layer is wedge-shaped.

Laminated glass panes of this type with a wedge-shaped intermediate layer and the optical principles on which they are based are known per se and are described, for example, in the international patent applications WO 2015/086234 A1, WO 2015/086233 A1, and WO 2009/071135 A1, the American patents U.S. Pat. Nos. 8,451,541 B2, 7,060,343 B2, 6,881,472 B2, 6,636,370 B2, and 5,013,134 or the German published patent applications DE 196 11 483 A1 and DE 195 35 053 A1.

The necessary wedge angle progression and the resultant thickness profile of the intermediate layer must be calculated separately for each pane shape. To date, the thickness profile according to the invention is achieved through the use of a corresponding slotted nozzle during extrusion of the film, or by selective stretching of the film heated with an appropriate temperature profile. These methods can also be combined, for example, by producing the thickness profile in one direction using a corresponding slotted nozzle during extrusion and by subsequent corresponding stretching of the film in the other direction.

However, problems occur during this type of production. When the film webs produced are wound up into rolls for storage and shipping, the rolls assume an increasingly conical shape that results in difficulties in the handling and transport of the rolls. To avoid these problems, it is known from European patent EP 0 647 329 B1 to produce film webs that have a uniform thickness profile on both edges on a width of at least 20% of the full width and a following wedge-shaped thickness profile that extends in each case to the center of the film web.

From the European patent EP 1 063 205 B1, a method for producing an intermediate layer film for laminated glass is known, wherein the starting composition for the intermediate layer film is fed to a production system that comprises an extruder, an extrusion die, a first cooling compression roller, and a second cooling compression roller, wherein the two compression rollers have in each case a clear width which is adjusted according to the desired cross-sectional profile of the intermediate layer film to be produced. However, with this method there is the risk that the thermoplastic material will cool too much in the cooling compression rollers, yielding unsatisfactory results.

A further disadvantage of the previously known wedge-shaped, thermoplastic films is that the area of the wedge-shaped profile in the HUD viewing windows is very much larger than is necessary for optimum suppression of the ghost images. In addition, production with two regions with different variations of the wedge angle, as is necessary, for example, for an application in a laminated glass pane with an HUD region and a camera window, is very difficult. European patent EP 2 883 693 A1 proposes to cut the section provided for the HUD region out of a film and then to replace it with a region having a wedge-shaped profile. However, no proposals are made for producing the wedge-shaped profile. In addition, distracting visible transitions develop at the points where the films are put together.

The object of the invention is to provide an improved thermoplastic film with at least one region with a variable wedge angle and to provide an improved method for its production.

The object is accomplished according to the invention by a film according to the independent claim 1. Preferred embodiments emerge from the dependent claims.

The invention provides a thermoplastic film (F) suitable for a laminated glass pane that comprises at least a defined region, which is provided for a camera window or an HUD (head-up display) region. This defined region has a non-zero wedge angle. The wedge angle can be constant within the defined region. This variant is particularly simple to produce. Preferably, the defined region has a variable wedge angle. Thus, the thickness h2 of the thermoplastic film also varies within the defined region. The maximum thickness, $h2_{max}$, is measured at the point at which the thermoplastic film in the defined region is the thickest. Situated adjacent the defined region is the surrounding region, in which the thermoplastic film has a constant thickness h1. The maximum thickness $h2_{max}$ in the defined region is less than the thickness h1 of the thermoplastic film in the surrounding region. The film according to the invention accordingly has a substantially constant thickness h1, except in the at least one defined region, in which the film is thinner everywhere than in the surrounding region. Preferably, the defined region is enclosed all around by the surrounding region, in other words, the defined region is surrounded on all sides by the surrounding region. With reference to the installation situation in the finished motor vehicle pane, this means that the defined region is directly adjacent the surrounding region at the top (roof edge), bottom, right, and left.

Particularly good results are obtained with the use of the film according to the invention as an intermediate layer in a laminated glass pane since the thickness of the laminated glass pane varies only within the defined region and no increase in the thickness occurs. In particular, in cases, where the defined region in the laminated glass pane is intended for the edge region (10% distance from the pane edges relative to the total height of the subsequent pane), such increases in thickness can be problematic. In particular, optical advantages result since, for example, the transitions to the vehicle body should appear as smooth as possible at the roof edge. In the case of panes that are thicker at the upper edge than at the lower edge, complicated measures are required to compensate for the differences.

The wedge angle is the angle between the surfaces of the film measured at one point. The fact that the wedge angle is non-zero in the defined region means that, substantially, in the defined region the wedge angle is different from zero. This does not rule out the fact that there are individual points within the defined region where the wedge angle is zero. In the case of a variable wedge angle profile, after an increase in the wedge angle, there is, at the transition to the decreasing wedge angle, at the corresponding inflection point, a point at which the wedge angle is zero.

The thickness of the thermoplastic film in the defined region is not constant, but is variable. The wedge angle in the defined region is preferably variable and changes depending on the location. Preferably, the wedge angle changes in two directions extending orthogonally relative to one another (bidirectional wedge). In the case of subsequent use in a windshield, the two directions correspond to the vertical direction (from the roof edge to the engine hood, i.e., from the top to the bottom) and the horizontal direction (from right to left).

The surrounding region is the region directly adjacent the defined region. The defined region is enclosed by the surrounding region. Typically, the area of the surrounding region is greater than the area of the defined region.

In the surrounding region, the thermoplastic film has a substantially constant thickness. This does not rule out the fact that the film has a certain production-related roughness in the surrounding region. However, production-related roughness differs from a planned decrease in the thickness in a contiguous region. The thickness h1 in the surrounding region is preferably from 50 μm to 2000 μm, particularly preferably 300 μm-850 μm, and typically 380 μm to 760 μm. Films with these thicknesses provide particularly stabile laminated glass panes.

The thermoplastic film according to the invention includes one or a plurality of defined regions in which the wedge angle profiles are adapted as needed.

When used in a laminated glass pane, the thermoplastic film according to the invention extends over the entire surface of the pane. The dimensions are governed by the respective intended use and the size of the subsequent laminated glass pane. Preferably, they have a length of 0.25 m to 5 m and a width of 0.25 m to 4 m.

The thermoplastic film can be formed by one or also by a plurality of flat thermoplastic films arranged one over another.

In a preferred embodiment, the thermoplastic film contains at least one material selected from the group consisting of polyvinyl butyral (PVB), ethylene vinyl acetate (EVA), polyethylene terephthalate (PET), polyurethane (PU), polypropylene (PP), polyacrylate, polyethylene (PE), polycarbonate (PC), polymethyl methacrylate, polyvinyl chloride, polyacetal resins, casting resins, polyacrylates, fluorinated ethylene propylene copolymers, polyvinyl fluoride, ethylene tetrafluoroethylene copolymers as well as copolymers and mixtures. Particularly preferably, the thermoplastic film is made substantially of PVB. This is particularly suitable as an intermediate layer for laminated glass panes and provides good results.

In another preferred embodiment of the invention, the thermoplastic film has a noise-reducing effect. As a result, the transmission of noises through a laminated pane provided with the thermoplastic film can advantageously be reduced, by which means distraction due to environmental noises and driving noises can be reduced. Such an effect can be achieved by a multi-ply, for example, three-ply thermoplastic film, wherein the inner ply (acoustic core) has higher plasticity or elasticity than the outer layers surrounding it, for example, as a result of a higher content of plasticizers. Particularly preferably, the thermoplastic film has a multi-ply structure, in particular a three-ply structure.

In a preferred embodiment, the difference in thicknesses $\Delta h2_{min}$ between the thickness of the thermoplastic film in the surrounding region h1 and the thickness at its thinnest point in the defined region is between 0.10 mm and 0.30 mm, preferably between 0.15 mm and 0.25 mm. Due to this minimal difference in thicknesses, laminated glass panes can be laminated perfectly without causing critical stresses.

The defined region for an HUD region preferably extends over an area from 10,000 mm$^2$ to 200,000 mm$^2$. Preferably, in a windshield for a vehicle, the HUD region is arranged on the driver's side.

The HUD region is usually situated on the driver's side in the through-vision region of the laminated glass pane. The term "through-vision region" refers to the region of the pane that is provided for and is suitable for through-vision. The through-vision region of a pane is, in particular, transparent and has no opaque, printed regions, such as the customary peripheral masking screen print in the edge region. In the context of the invention, "transparent" means a pane with transmittance in the visible spectral range >70%.

Preferably, in the finished laminated glass pane, the wedge angle in the defined region initially increases slowly from the bottom upwards in order to avoid image distortions due to an abrupt increase. Then, in a central region, the wedge angle increases corresponding to a previously optimized profile in order to optimally suppress the creation of ghost images. This is followed by a region in which the wedge angle slowly decreases in order to again make the transition to the first thermoplastic film as little visible as possible. Such a wedge angle progression is suitable for camera windows and HUD regions.

The defined region for a camera window preferably extends over an area of 2000 mm$^2$-10,000 mm$^2$. The camera window is preferably arranged, in the case of a windshield for a vehicle, in the vicinity of the roof edge. This region is usually no longer part of the through-vision region.

The thermoplastic film has a first surface and an opposite second surface. In the surrounding region having a constant thickness h1, the planes of the first surface and the second surface are arranged parallel to one another. In a preferred embodiment, the plane of the second surface in the defined region is continuously parallel to the plane of the first surface in the surrounding region (see embodiment in FIG. 4), in other words, material was ablated in the defined region only starting from the first surface compared to the surrounding region. Consequently, in the defined region, the first surface is not continuously parallel to the plane of the second surface in the surrounding region. This film can be produced in a single step.

In another preferred embodiment, in the defined region, the first surface and the second surface are not parallel to the planes of the first and the second surface in the surrounding region. In this case, material has been ablated from the side of the first surface and from the side of the the second surface. Particularly preferably, this material ablation has been done symmetrically, i.e., at each point, exactly as much has been ablated from the side of the first surface as from the side of the second surface (see embodiment in FIG. 10). As a result, in the defined region, the thermoplastic film has a mirror plane/plane of symmetry. The plane of symmetry is arranged parallel to the planes of the first surface and the second surface in the surrounding region centrally between these planes. This symmetrical design yields particularly good results. The embodiment is particularly advantageous in combination with multilayer thermoplastic films since only the outer layers are affected by less material ablation in each case than when material is ablated from only one side of the film.

In another preferred embodiment, the thermoplastic film includes more than one defined region, preferably two defined regions. In this case, a first defined region is particularly preferably provided as an HUD region and is situated in the through-vision region of the pane and a second defined region is provided as a camera window and is situated in the upper third of the pane. Since, in the thermoplastic film according to the invention, the wedge angle progressions in the defined regions are realized by a decrease in thickness, a plurality of defined regions can be provided without causing increased stresses in the finished laminated glass pane.

In one embodiment of the invention, the thermoplastic film can have at least one tinted region. Such a tinted region at the upper edge of the pane is known to the person skilled in the art, for example, as a "shaded band"—it can reduce distraction of the driver from blinding sunlight.

The thermoplastic film can have, in one embodiment of the invention, a solar or thermal protection function. For example, the thermoplastic film can include a coating reflective in the infrared range or IR absorbing additives.

The invention further provides a method for producing a thermoplastic film according to the invention that is suitable as an intermediate layer for a laminated glass pane. In a first step of the method according to the invention, a thermoplastic film with a substantially constant thickness h1 is provided. Such films that are suitable as intermediate layers for laminated glass panes are known. In a second step, thermoplastic polymer is ablated in a previously defined region by laser. A previously defined wedge angle profile is produced. By using the laser, it is possible to precisely transfer a wedge angle profile previously calculated using simulation tools to the thermoplastic film having a constant thickness. This is particularly advantageous in the case of relatively complex wedge angle profiles, which are not so precisely producible with prior art methods.

The method according to the invention is particularly flexible, since the position of the defined region is freely selectable. Thus, for example, a suitable film can be produced with an HUD region for right-hand drive or left-hand drive by ablating thermoplastic polymer at the corresponding location. Since the wedge angle is produced by ablation, no material incompatibilities arise. In addition, optical defects at the edges are reduced, when, for example, defined regions are produced separately and inserted in a recess in a film. The method according to the invention is particularly suitable for processing films consisting of multiple layers having different compositions. One example is an intermediate layer having a noise-reducing effect. Since only small amounts of material have to be removed, such films can also be provided with wedge angle progressions without distracting optical defects occurring. Preferably, such an intermediate layer with a noise-reducing effect comprises three layers. Preferably, with the method according to the invention only so much material is ablated that the inner ply is not touched. The inner ply can have a different refractive index such that it can result in distracting optical defects if material is ablated from this ply. The method according to the invention is particularly suitable for producing thermoplastic films having at least one defined region that is enclosed on all sides by the surrounding region. Such a thermoplastic film is not possible with prior art methods such as disclosed in EP 0 647 329 B1. Using the method described there, only thermoplastic films whose region with a varying wedge angle extends up to the edge of the thermoplastic film can be obtained. However, when used in a laminated glass pane, this has the already-described disadvantage that the thickness of the pane varies from the top to the bottom edge.

With a wedge angle varying in two directions, double images and ghost images can be particularly effectively avoided or reduced. The relationship between wedge angle progressions and the prevention and reduction of ghost images and double images is known in the prior art and is described, for example, in WO2015086234A1 and in WO2015086233A1. Preferably, the optimum wedge angle progression has been optimized in advance using simulation tools for prevention of double images and ghost images.

In a preferred embodiment of the method according to the invention, the first surface of the unprocessed thermoplastic film is first treated in the defined region with the laser and polymer is ablated there. Then, the second surface of the thermoplastic film is treated with the laser in the same defined region. Preferably, the same amount of polymer is ablated on both sides in each case (mirror symmetrically). In this manner, the ablation on one side can be reduced such that polymer only has to be ablated superficially in each case. In the case of multilayer films, ablation of material from a plurality of layers is thus avoided. Thus, optical defects caused by the ablation are kept low.

In a preferred embodiment of the method according to the invention, the ablation depth is between 0.10 mm and 0.30 mm, preferably between 0.15 mm and 0.25 mm. The ablation depth is the depth in which material is ablated, caused by the interaction between the laser and the material. In the case of the ablation depths described, material is ablated only very superficially. Consequently, thickness variations are very low over the entire film and, thus, the film is particularly well suited for use as an intermediate layer for a laminated glass pane. In addition, at these ablation depths, multilayer films, in particular noise-reducing films, can also be modified without causing distracting optical defects at the edge of the defined region.

The invention further proposes a laminated glass pane with a thermoplastic film according to the invention:

The laminated glass pane according to the invention includes at least one first glass pane, a second glass pane, and a thermoplastic film according to the invention, with the thermoplastic film arranged between the first glass pane and the second glass pane. The laminated glass pane according to the invention with a locally defined region with a variable wedge angle is particularly stable, since the thickness change in the film is set only for a comparatively small region. In the case of prior art films with a constant wedge angle, the thickness varies in a vertical and/or horizontal direction over the entire height and/or width of the pane, resulting in the occurrence of stresses. The thickness in such a prior art laminated glass pane is greater at the upper end than at the lower end. This difference in thickness also results in optical disadvantages with an installed pane since a thicker pane edge sometimes protrudes at the transition to the roof edge. With the use of a thermoplastic film according to the invention, the thickness of the laminated glass pane according to the invention is the same at the upper and lower edge.

The total thickness of the laminated glass pane is, in an advantageous embodiment, from 3.5 mm to 6.0 mm, preferably from 4.0 mm to 6.0 mm, particularly preferably from 4.4 mm to 5.6 mm. Laminated panes with these thicknesses have adequate mechanical stability and strength and advantageous acoustic properties in terms of shielding against ambient noises. However, they are, on the other hand, not too thick and heavy to be able to be used as a windshield of typical vehicles, in particular motor vehicles.

The outer pane and the inner pane preferably have a constant thickness with substantially plane-parallel primary surfaces and a circumferential side edge connecting them.

The thickness of the inner pane is, in an advantageous embodiment, from 0.3 mm to 3.5 mm, preferably from 0.7 mm to 2.6 mm.

The thickness of the outer pane is, in an advantageous embodiment, at least 1.8 mm, preferably at least 2.1 mm. The thickness of the outer pane is preferably at most 4.5 mm, preferably at most 3.5 mm. The thickness of the outer pane is, in a particularly advantageous embodiment, from 2.1 mm to 4.5 mm, for example, from 2.1 mm to 3.5 mm or from 2.5 to 4.5 mm, preferably from 2.5 mm to 3.5 mm. In this range, the laminated pane has advantageous mechanical stability and noise shielding properties, but is nevertheless still sufficiently thin and light to be able to be used as a windshield.

The outer pane and the inner pane are preferably made of glass, in particular soda lime glass, which is common for windows. The panes can, however, in principle, also be made of other types of glass (for example, borosilicate glass, quartz glass, aluminosilicate glass) or transparent plastics (for example, polymethyl methacrylate or polycarbonate).

The outer pane and the inner panes can, independently of one another, be non-tempered, partially tempered, or tempered. If at least one of the panes is to be tempered, this can be done thermally or chemically.

The invention further proposes a production method for the laminated glass pane. Two glass panes are provided. The thermoplastic film according to the invention is placed between these glass panes and the package comprising two glass panes and a thermoplastic film according to the invention is bonded. Preferably, the bonding is done in a lamination process. Suitable methods for lamination, such as the autoclave method or the vacuum bag method are known to the person skilled in the art.

The invention further proposes a head-up display arrangement, an arrangement with a camera, and the use of laminated glass panes.

BRIEF DESCRIPTION OF THE DRAWINGS

Embodiments of the present invention are described by way of example with reference to the appended drawings, which depict:

FIG. 3 an exemplary structure of a laminated glass pane with a wedge-shaped intermediate layer, FIG. 4 a cross-section through a region of a thermoplastic film according to the invention, FIG. 5 a plan view of a laminated glass pane according to the invention with a camera window, FIG. 6 the basic structure of a camera arrangement, FIG. 7 a plan view of a laminated glass pane according to the invention with an HUD region, FIG. 8 a schematic representation of a method according to the invention, FIG. 9 a schematic plan view of a defined region during the method, FIG. 10 a cross-section through a region of a thermoplastic film according to the invention, and FIG. 11 a cross-section through a region of a thermoplastic film according to the invention.

Figure 1:
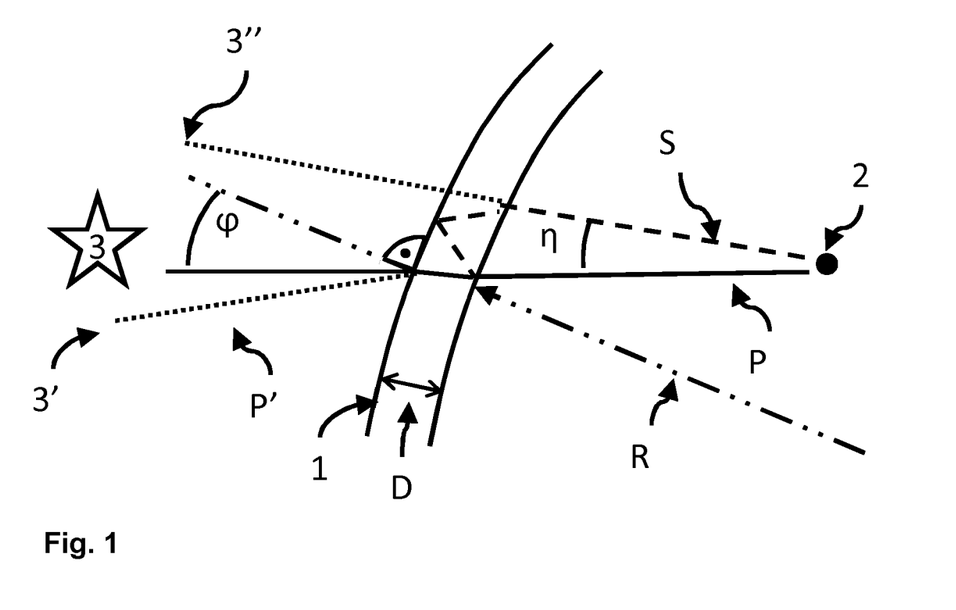
FIG. 1 the basic context of the development of double images in transmittance.

FIG. 1 depicts the basic context of the development of double images in transmittance with reference to a beam image. A curved pane 1 is assumed. The curved pane has, at the point of entry of a beam into the curved glass pane 1 a radius of curvature (R+D). Light is now emitted from a light source 3. This light strikes the pane and is refracted in accordance with the known refraction laws at the transition from air to glass on the first boundary surface and from glass to air on the second boundary surface and reaches the eye 2 of an observer. This beam is depicted as a solid line P. From the perspective of the observer, the light source 3 appears to be situated at the location 3'. This is depicted as beam P'. In addition to this beam P referred to as the primary beam, the beam is, however, only partially refracted on the second gas/air boundary surface in the manner described above; a smaller fraction is reflected on the second boundary surface and is once again reflected on the first boundary surface before the beam now passes through the second boundary surface and reaches the eye 2 of the observer. This beam, the so-called "secondary beam" is depicted as a dashed line S. From the perspective of the observer, the light source 3 also appears to be situated at the location 3". The angle η enclosed by the primary beam P' and the secondary beam S is the so-called "double image angle".

In order to address this double image, provision can now be made to provide a wedge angle between the two boundary layers assumed to be substantially parallel in FIG. 1.

According to J. P. Aclocque "Doppelbilder als störender optischer Fehler der Windschutzscheibe" [Double Images As Interfering Optical Errors in Windshields]" in Z. Glastechn. Ber. 193 (1970) pp. 193-198, the double image angle can be calculated as a function of the radius of curvature of the glass pane and the angle of incidence of the light beam according to the following equation:

$$\eta = \frac{2d}{R} \cdot \frac{\sin\varphi}{\sqrt{n^2 - \sin^2\varphi}},$$

where

η is the double image angle, n is the index of refraction of the glass, d is the thickness of the glass pane, R is the radius of curvature of the glass pane at the location of the incident light beam, and φ is the angle of incidence of the light beam relative to the perpendicular on the tangent to the pane.

In the case of flat glass panes, the double image angle η is, according to the following formula $$\eta = 2 \cdot \delta \cdot \frac{\sqrt{n^2 - \sin^2\varphi}}{\cos\varphi}$$

a function of the wedge angle δ formed by the glass surfaces.

Thus, by setting the aforementioned formulas equal, the wedge angle necessary for the elimination of the double image can be calculated:

$$\delta = \frac{d}{R} \cdot \frac{\cos\varphi \cdot \sin\varphi}{n^2 - \sin^2\varphi}.$$

Figure 3:
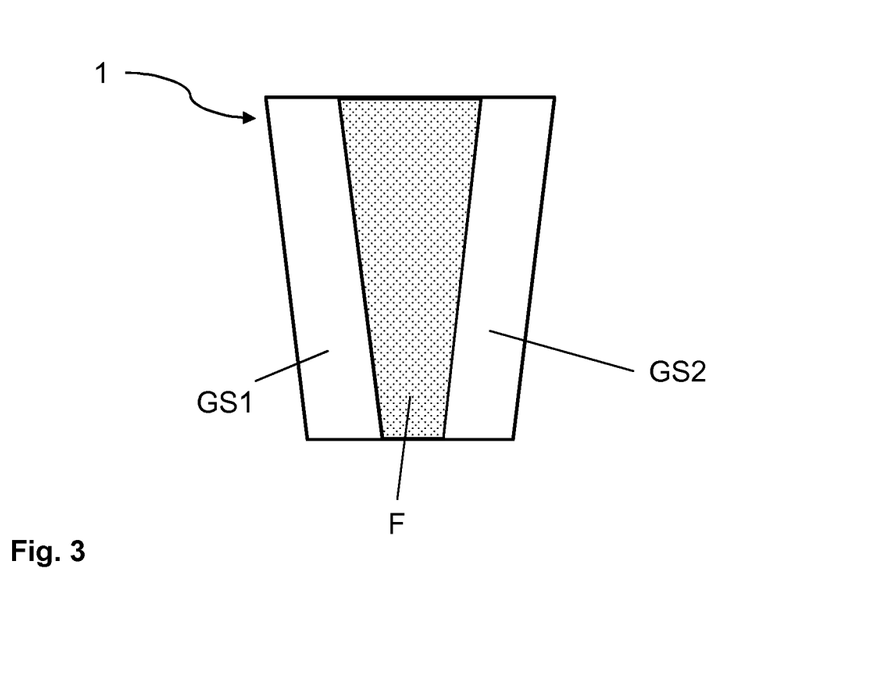

Usually, this wedge angle is realized in that in laminated glass panes 1, a wedge-shaped intermediate layer F is placed between a first glass layer $GS_1$, and a second glass layer $GS_2$, see FIG. 3. It can usually be assumed for the sake of simplicity that the index of refraction n is constant, since the difference in the index of refraction of the intermediate layer F and the glass panes $GS_1$, $GS_2$ is rather small such that there is hardly any effect due to the small difference.

This idea can also be applied with curved windshields. Usually, for the sake of simplicity, the angle of incidence and the radius of curvature are assumed for a reference eye point, and the wedge angle determined therewith is used for the entire windshield.

In the case of large laminated glass panes 1, so-called "panorama panes", and/or more highly curved laminated glass panes 1, this approach is, however, no longer adequate such that here, usually, a wedge-angle progression variable in the vertical direction must be determined.

Then, it is possible, for example, by pointwise calculation along an imaginary vertical center line of a laminated glass pane and possible interpolation, to determine a compensation wedge-angle profile δ. After determination of the compensation wedge angle profile, a corresponding intermediate layer F can be produced.

With regard to head-up displays, a problem develops which is similar to the phenomenon of double images and is referred to as a ghost image.

Figure 2:
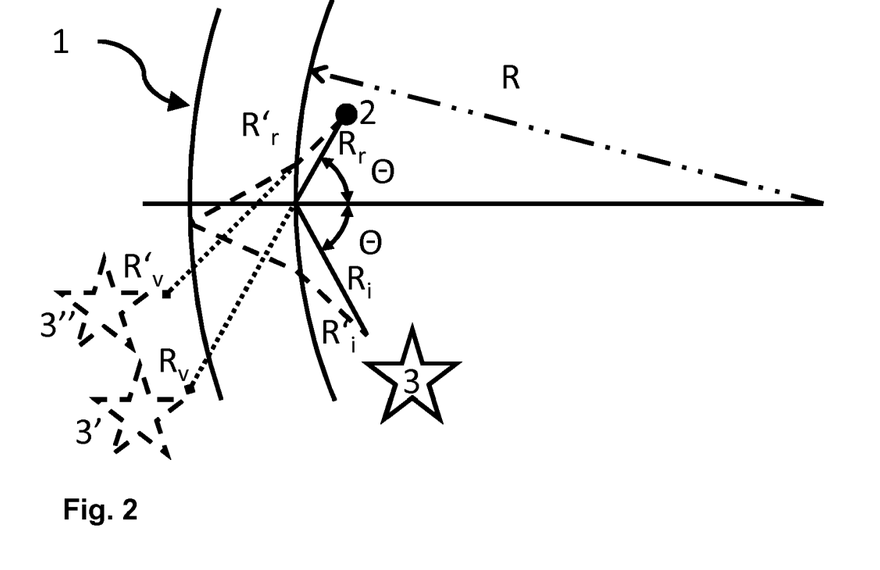
FIG. 2 the basic context of the development of ghost images in reflection.

FIG. 2 presents the basic context of the development of ghost images in reflection with reference to a beam image. Here, a curved glass pane 1 is assumed. The curved glass pane 1 has a radius of curvature R at the point of entry of a beam into the curved glass pane 1. Light is now emitted from a light source 3, which is representative of a head-up display HUD. This light impinges on the glass pane 1 along the beam $R_i$ from the inside at an angle Θ and is reflected there at the same angle Θ. The reflected beam $R_r$ reaches the eye 2 of an observer. This beam path is depicted as a solid line. From the perspective of the observer, the light source 3 appears to be situated virtually at the location 3', i.e., in front of the glass pane 1. This is depicted as beam $R_v$. In addition to this first beam, another beam reaches the eye 2 of the observer. This beam $R'_i$ likewise originates from the light source 3. However, this beam $R'_i$ penetrates, in accordance to the known laws of refraction, into the glass pane 1 on the inner air/glass boundary surface and is reflected on the outer glass/air boundary surface before the beam passes through the inner boundary surface and reaches the eye 2 of the observer as beam $R'_r$. The term "inner boundary surface" thus refers to the boundary surface that is situated closer to the observer, whereas the term "outer boundary surface" refers to the boundary surface that is farther away from the observer. This beam path is depicted as a dashed line. From the perspective of the observer, the light source 3 appears to be situated virtually at the location 3", i.e., likewise in front of the glass pane 1. This is depicted as beam $R'_v$.

To address this problem, the wedge angle can now be altered such that the beam $R'_r$ reflected on the outer boundary surface and the beam $R_r$ reflected on the inner boundary surface overlap relative to the eye 2 of the observer, i.e., the beam reflected on the outer boundary surface exits at the point of reflection of the beam impinging on the inner boundary surface.

However, if this is done only for a single eye position, the wedge angle determined therefrom can yield non-optimum results. This can be explained, among other things, by the fact that both the body sizes of drivers for whom the HUD displays are primarily intended and the seating position are very different such that there are a large number of possible eye position. This results in the fact that the virtual display is situated in different places depending on the eye position; and, accordingly, there is, for each of these eye positions, a sometimes different value for an optimized wedge angle. In addition, a wedge angle optimized exclusively for ghost images usually results in an overcompensation of double images such that the double images thus caused are again problematic relative to the perception of the observer and/or compliance with regulatory test specifications and/or compliance with customer specifications relative to double images.

Wedge angle profiles that take into account both the different eye positions, i.e., also the compensation of double images in the HUD region are not constant in either the horizontal or the vertical direction. The resultant thickness profiles for the intermediate layer F cannot be produced by simple extrusion processes.

Figure 4:
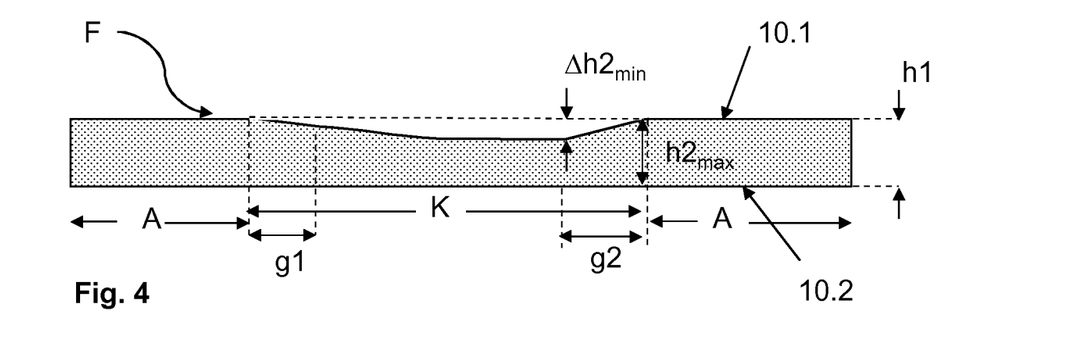

FIG. 4 depicts a region of a thermoplastic film according to the invention F in cross-section. The plastic film F is made of PVB in the example. In the surrounding region A, the thickness h1 is 0.76 mm and is substantially constant. In the defined region K, the thickness decreases. At the thinnest point, the thermoplastic film F is 0.56 mm thick. In other words, the thickness difference $\Delta h2_{min}$ between the thicknesses in the surrounding region and at the thinnest point in the defined region is 0.76 mm-0.56 mm=0.20 mm=$\Delta h2_{min}$. The film F is thinner in the defined region than in the surrounding region, in other words, even at its thickest point, the thickness $h2_{max}$ is less than the thickness h1. In the defined region K, the wedge angle in the first boundary region g1 first increases slowly and, then, increases in a central region corresponding to a previously optimized profile. After that, the wedge angle decreases again slowly in a second boundary region g2 in order to make the transition to the surrounding region A as little visible as possible. Accordingly, the thickness of the film first decreases slowly in the first boundary region g1, then changes in a central region according to a previously optimized profile, and then decreases again slowly in the second boundary region g2. This arrangement with two boundary regions with a slowly rising or falling wedge angle above and below or to the right and to the left relative to an installed windshield is particularly advantageous to minimize the optical defect at the transition between the surrounding region A and the defined region K. It can be seen in cross-section that no material ablation occurred along the second surface 10.2, in other words, in the defined region, the second surface continues in the same plane as in the surrounding region A parallel to the first surface 10.1 in the surrounding region. Thus, in the defined region, material was ablated only from the side of the first surface 10.1.

Figure 5:
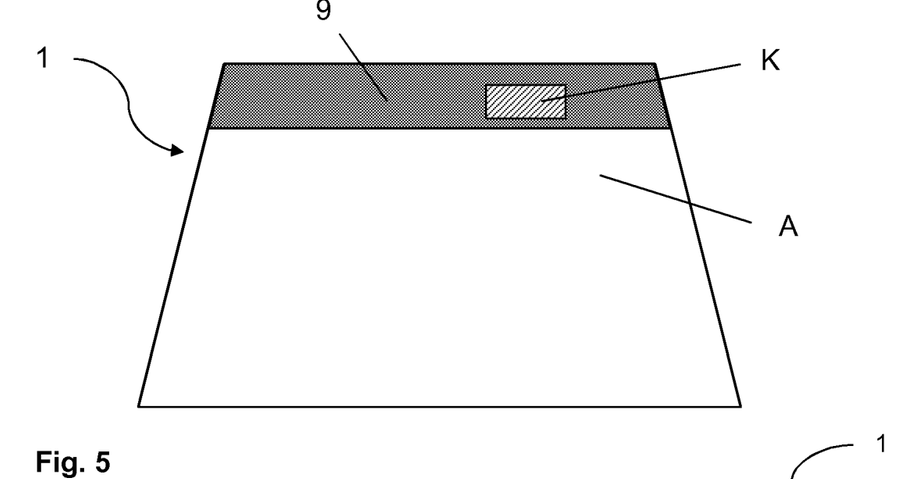

FIG. 5 depicts a plan view of a laminated glass pane 1 according to the invention. The laminated glass pane is provided as a windshield of a passenger car. The upper edge in the figure borders the roof edge in the vehicle, and the lower edge borders the engine edge. A camera window K is arranged in the upper third of the laminated glass pane outside the through-vision area. The windshield preferably has, in the upper edge region, a masking print 9. Masking prints are common for vehicle panes outside the central field of vision to conceal attachment parts or to protect the adhesive with which the vehicle pane is connected to the car body against UV radiation. The masking print typically consists of a black or dark enamel applied and fired in a screen printing process. In the example, the masking print 9 frames the camera window K of the vehicle pane circumferentially to conceal the camera positioned therebehind. The laminating glass pane consists of two glass layers, GS1 and GS2, and a thermoplastic film F, which is arranged between these glass layers. The glass layers GS1 and GS2 are made of soda lime glass and have a thickness of 2.1 mm. The thermoplastic film F is formed as described in FIG. 4. The fixed area K forms the camera window.

Figure 6:
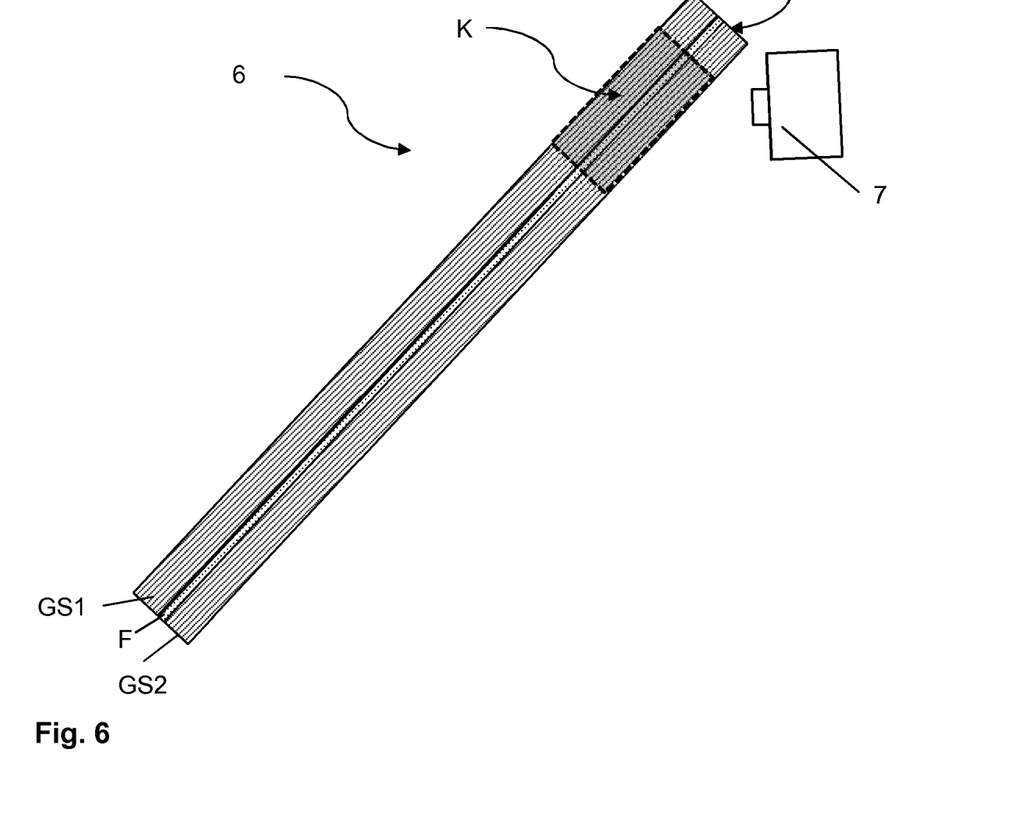

FIG. 6 depicts a possible camera arrangement 6 consisting of the laminated glass pane 1 described and a camera 7. The glass layer GS1 of the laminating glass pane 1 is directed toward the outside of the vehicle and the glass layer GS2 toward the inside. The camera 7 is arranged in the interior of the vehicle and records the light beams that pass through the laminated glass pane 1 from the outside inward. The camera is aimed at the defined region; this means that it is mounted such that the light beams pass through the region with the optimized wedge angle profile. Thus, the double images in transmittance are efficiently reduced. This can, for example, be used successfully in the area of lane assistance systems.

Figure 7:
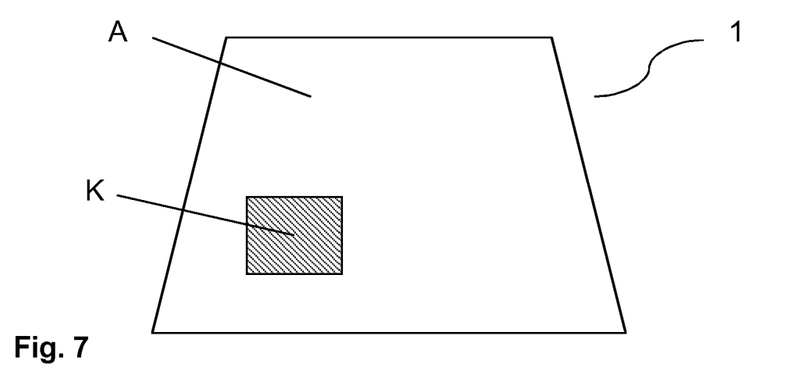

FIG. 7 depicts a view of a laminated glass pane 1 according to the invention with an HUD region that is surrounded on all sides by the surrounding region A. The HUD region is situated in the defined region K, in which a wedge angle profile optimized to avoid ghost images and double images is arranged. In the example depicted, the HUD region is situated on the left side of the windshield in the through-vision region. During the production of the laminated glass pane 1 from the glass layer GS1, the glass layer GS2, and a thermoplastic film F according to the invention, this design can be readily adapted for a right-hand drive vehicle by ablating thermoplastic polymer on the right-hand side in the defined region K according to a previously optimized wedge angle profile.

Figure 8:
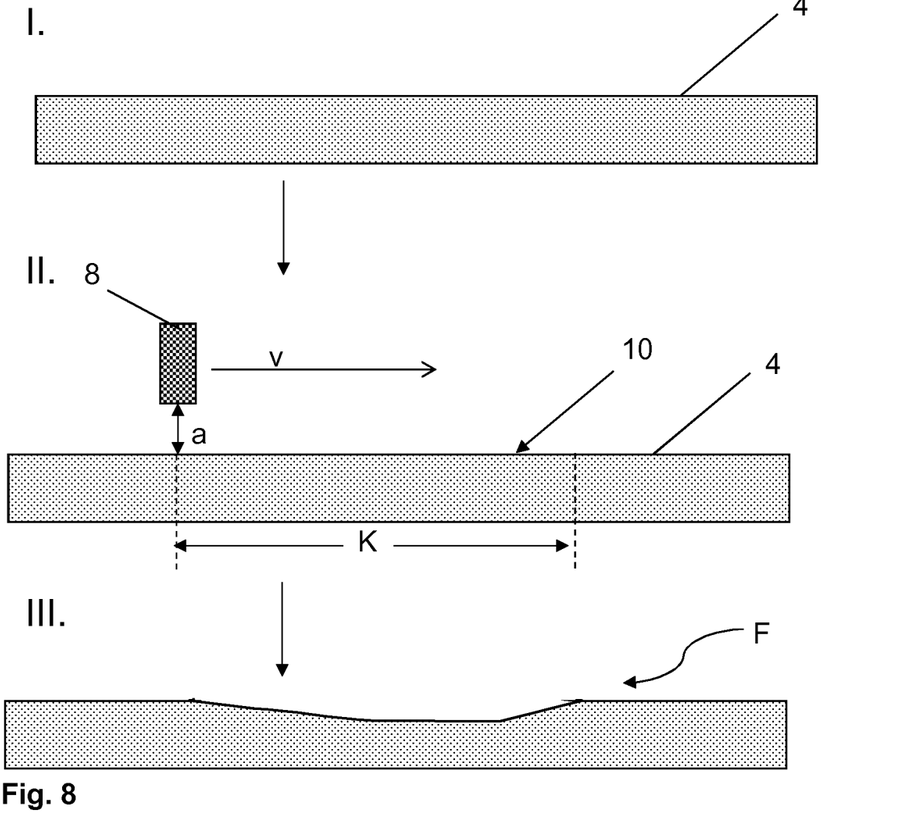
Figure 9:
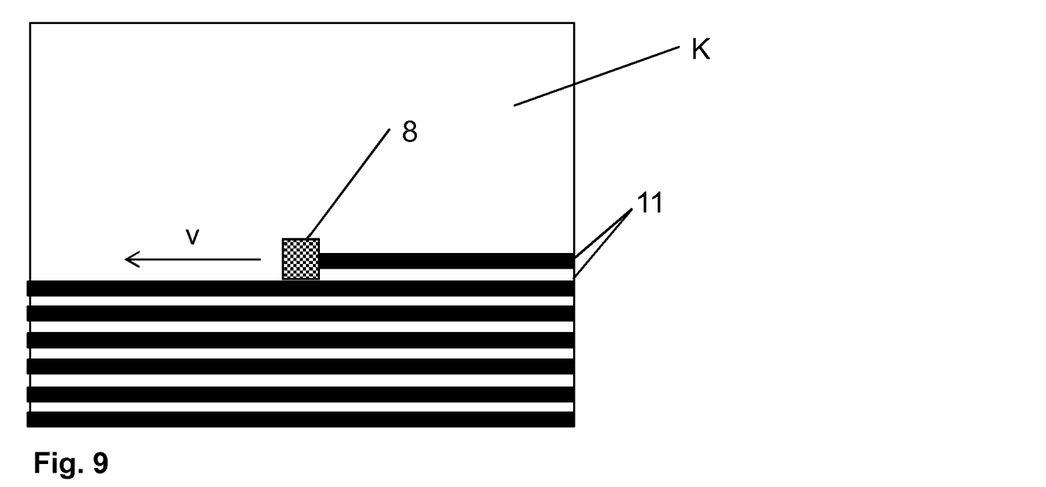

FIG. 8 represents, by way of example, a method cycle according to the invention. In step I., A thermoplastic film having a substantially constant thickness 4 is provided. In step II., the laser 8 is positioned at a distance a of approx. 1700 mm from the surface 10 of the thermoplastic film having a constant thickness 4 in the defined region K. Suitable as a laser is, for example, a $CO_2$ laser with a wavelength of 10.6 μm, and a power of 250 W. The defined region was traversed in lines 11 with the laser (see FIG. 9). FIG. 9 depicts a plan view of a defined region K that is treated in lines with a laser. The laser power was low at the beginning and was gradually increased. At a speed v of 10 m/s, polymer was ablated in lines in the defined region. The laser was offset by 0.1 mm after a line in each case and then polymer was ablated along the next line. After approx. 50 lines (5 mm), the power P of the laser was increased in order to increase the polymer ablation. This also increases the ablation depth.

This operation is carried out until the desired profile is obtained. By means of this stepped increase in power, it was possible to specifically obtain the desired wedge angle.

Figure 10:
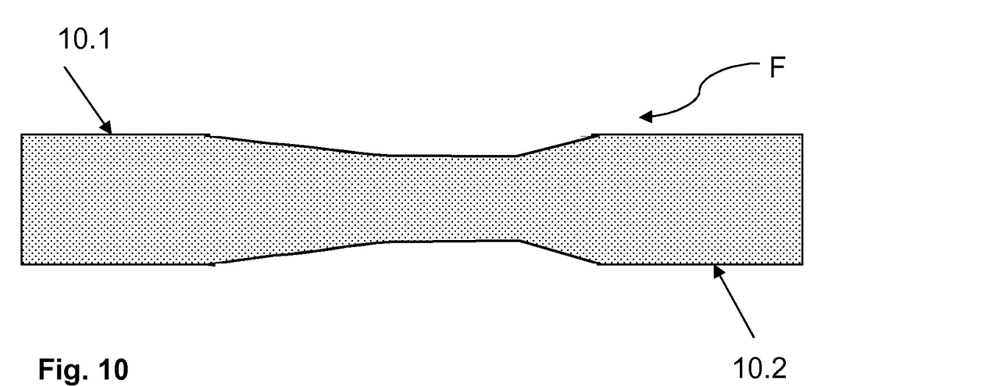

FIG. 10 depicts a thermoplastic film F that was processed with a laser in the defined region on its first surface 10.1 and on its second surface 10.2. There, mirror symmetrical ablation of thermoplastic polymer was done. Thus, it is possible to obtain larger wedge angles, while the absolute ablation depths on the surfaces are smaller than when ablation is done on only one surface.

Figure 11:
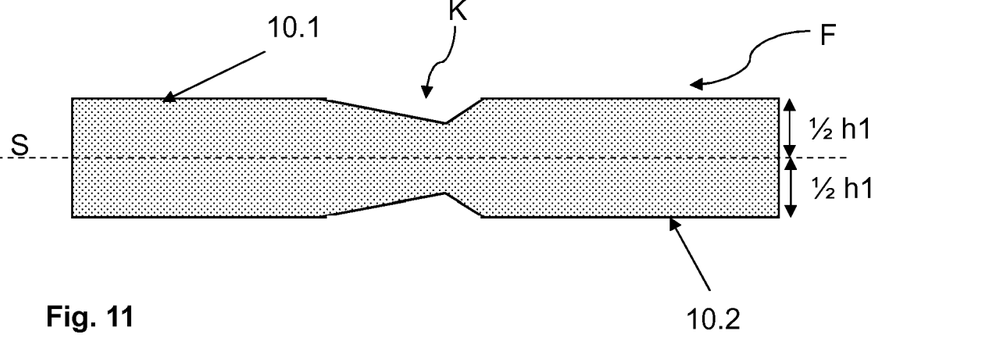

FIG. 11 depicts a thermoplastic film F that was processed with a laser in the defined region as in FIG. 10 on the first surface 10.1 and on the second surface 10.2. Only the wedge angle progression in the defined region K is different. In this case, the same amount of material was ablated on each surface 10.1 and 10.2. This results in a mirror symmetrical arrangement of the two surfaces 10.1 and 10.2 in the defined region K. Here, the mirror plane plane of symmetry S is the plane that runs parallel to the planes of the first surface 10.1 and the second surface 10.2 in the surrounding region centrally between them. The mirror plane S runs, accordingly, at a distance of ½ h1 parallel to the plane of the first surface 10.1 and parallel to the plane of the second surface 10.2 in the surrounding region A.

LIST OF REFERENCE CHARACTERS

GS1 glass layer 1, glass pane 1
GS2 glass layer 2, glass pane 2
F thermoplastic film
K defined region A surrounding region
g1 first boundary region
g2 second boundary region
h1 thickness of the unprocessed thermoplastic film, thickness of the thermoplastic film in the surrounding region A
h2 thickness of the thermoplastic film in the defined region
$h2_{max}$ maximum thickness of the thermoplastic film in the defined region
S plane of symmetry, mirror plane
1 glass pane
2 eye
3 light source, HUD projector
4 thermoplastic film having a constant thickness, unprocessed thermoplastic film
5 HUD arrangement
6 camera arrangement
7 camera
8 laser
9 masking print
10 surface of the thermoplastic film
10.1 first surface of the thermoplastic film
10.2 second surface of the thermoplastic film
11 line

The invention claimed is:

1. Thermoplastic film suitable as an intermediate layer for a laminated glass pane, wherein the thermoplastic film comprises
a defined region that is provided for a camera window or an HUD region, said defined region having a non-zero wedge angle, and
a region surrounding the defined region on all sides of said defined region, the thermoplastic film having a constant thickness in said region entirely surrounding the defined region on all sides of said defined region, wherein
a maximum thickness in the defined region of the thermoplastic film is less than a thickness in the surrounding region.

2. The thermoplastic film according to claim 1, wherein the defined region has a variable wedge angle.

3. The thermoplastic film according to claim 1, wherein the thickness of the thermoplastic film in the surrounding region is between 50 μm and 2000 μm.

4. The thermoplastic film according to claim 1, wherein the thermoplastic film is made substantially of PVB.

5. The thermoplastic film according to claim 1, wherein the thermoplastic film has a noise-reducing effect.

6. The thermoplastic film according to claim 1, wherein the defined region extends over an area of 2000 mm² to 200,000 mm² for an HUD region and over an area of 2000 mm² 10,000 mm² for a camera window.

7. The thermoplastic film according to claim 1, wherein the thermoplastic film has a first surface and an opposite second surface, whose planes are arranged parallel to one another in the surrounding region, and wherein the thermoplastic film has, in the defined region, a mirror plane/plane of symmetry, which is arranged parallel to the planes of the first surface and the second surface in the surrounding region centrally between these planes.

8. Method for producing a thermoplastic film suitable as an intermediate layer for a laminated glass pane, wherein the thermoplastic film comprises at least a defined region that is provided for a camera window or an HUD region, said defined region having a non-zero wedge angle, and the thermoplastic film comprises a surrounding region that surrounds the defined region on all sides of said defined region, the thermoplastic film having a constant thickness in said region entirely surrounding the defined region on all sides of said defined region, wherein a maximum thickness in the defined region of the thermoplastic film is less than a thickness in the surrounding region, the method comprising:
providing a thermoplastic film having a constant thickness,
ablating the thermoplastic film using a laser in at least one defined region.

9. The method according to claim 8, wherein the wedge angle in the defined region changes.

10. The method according to claim 8, wherein first, a first surface of the thermoplastic film having a constant thickness is treated with the laser in the defined region and then, the second surface of the thermoplastic film is treated with the laser in the same defined region.

11. The method according to claim 8, wherein an ablation depth is between 0.10 mm and 0.30 mm.

12. Laminated glass pane, comprising a first glass layer, a second glass layer, and a thermoplastic film according to claim 1, wherein the thermoplastic film is arranged between the first glass layer and the second glass layer.

13. Method for producing a laminated glass pane, comprising:
providing a first glass pane
providing a second glass pane
placing a thermoplastic film according to claim 1 on the first glass pane,
placing a second glass pane on the thermoplastic film, and
joining the second glass pane to the thermoplastic film.

14. Head-up display arrangement, comprising a projector for illuminating a head-up display area of a laminated glass pane and a laminated glass pane according to claim 12, wherein, during operation, the projector substantially illuminates the defined region.

15. Camera arrangement, comprising a camera and a laminated glass pane according to claim 12, wherein the camera is directed at the defined region and records light beams that pass through the laminated glass pane.

16. A method comprising utilizing the laminated glass pane according to claim 12 as a front pane with a head-up display and/or camera window in means of transportation on water, on land, and in the air.

17. The thermoplastic film according to claim 3, wherein the thickness of the thermoplastic film in the surrounding region is between 300 μm and 850 μm.

18. The thermoplastic film according to claim 17, wherein the thickness of the thermoplastic film in the surrounding region is between 380 μm and 760 μm.

19. The thermoplastic film according to claim 6, wherein the defined region extends over an area of 10,000 mm² to 200,000 mm² for an HUD region.

20. The method according to claim 11, wherein the ablation depth is between 0.15 mm and 0.25 mm.

* * * * *